United States Patent [19]

Soeterik

[11] 4,143,015

[45] Mar. 6, 1979

[54] WATER BASE, NON-POLLUTING, SLOW LEACHING, ANTI-FOULING PAINT

[76] Inventor: Ernolff Soeterik, 1180 Turquoise St., San Diego, Calif. 92109

[21] Appl. No.: 761,306

[22] Filed: Jan. 21, 1977

[51] Int. Cl.$^2$ .................. C08L 61/24; C08L 31/04
[52] U.S. Cl. .................. 260/29.4 UA; 106/15.05; 260/29.6 NR
[58] Field of Search .................. 260/29.4 R, 29.4 UA, 260/851, 29.6 NR, 45.75 K, 45.75 C; 106/15 R

[56] References Cited

U.S. PATENT DOCUMENTS

| | | | |
|---|---|---|---|
| 2,287,218 | 6/1942 | Young et al. ................ | 260/19 |
| 3,236,793 | 2/1966 | Robins et al. ............... | 106/15 R |
| 3,331,693 | 7/1967 | Taylor ........................ | 106/15 R |
| 3,794,501 | 2/1974 | Denio ......................... | 106/15 R |
| 3,861,949 | 1/1975 | Onozuka et al. ............ | 106/15 R |
| 4,010,141 | 3/1977 | Onozuka et al. ............ | 260/45.75 K |

*Primary Examiner*—Theodore E. Pertilla

[57] ABSTRACT

A water-base vinyl paint containing a toxicant for the protection of underwater surfaces from fouling growth. Suitable modified vinyl acetate resins are dissolved in a water solution brought to a pH of at least about 8 by a suitable poly-functional amine. A suitable toxicant, such as cuprous oxide is dispersed in the solution, and after the addition of modifiers, the finished product is then painted onto a surface to be protected from fouling growth when immersed into the ocean. The dried coating dissolves or leaches slowly in alkaline water, such as sea water, providing constantly fresh toxicant to prevent fouling growth. Desired characteristics of the coating may be modified by adding other agents, such as defoamers, urea formaldehyde resins, to the coating solution.

11 Claims, No Drawings

WATER BASE, NON-POLLUTING, SLOW LEACHING, ANTI-FOULING PAINT

BACKGROUND OF THE INVENTION

Many different types of anti-fouling paints have been developed which attempt to limit fouling growth on underwater surfaces. While many of these are successful for a time, all have limitations.

Surfaces which are in contact with sea water are subject to fouling by marine organisms such as barnacles, tube worms, grass growth, mussels. Many anti-fouling paints are available which include a toxicant, such as cuprous oxide, Tributyltin Floride and any organic resin, dissolved in an organic solvent. Many of these paints are successful for only limited time periods, since the toxicant at the surface leached out and additional toxicant within the paint film cannot directly contact and poison organisms as they begin to grow on the paint surface.

Those paints which comprise an organic resin dissolved in an organic solvent are a serious source of air pollution as the solvent evaporates. Recently, environmental controls have been imposed, severely limiting the use of organic solvent based finishes when applied outdoors where evaporated solvent recovery is not possible.

Thus, there is a rapidly growing need for anti-fouling paints which are physically durable, prevent fouling over long periods, but do not produce significant air pollution when applied. Further, the use of organic solvents are limited, due to cost which reflect the current fuel crises.

OBJECTS OF THE INVENTION

It is, therefore, an object of this invention to provide an anti-fouling paint overcoming the above noted problems.

Another object of this invention is to provide a water-base anti-fouling paint which dries without releasing any significant air pollutants.

A further object of this invention is to provide an anti-fouling paint of improved durability and appearance.

Yet another object of this invention is to provide an anti-fouling paint which releases toxicants at the surface uniformly over a long period.

SUMMARY OF THE INVENTION

The above objects, and others, are accomplished in accordance with this invention by development of an anti-fouling paint basically comprising a toxicant dispersed in a solution of a suitable modified vinyl acetate resin dissolved in a water solution brought to a pH of at least about 8 by the addition of a suitable quantity of a poly-functional amine. A quantity of urea formaldehyde resin is added to the paint to adjust the pH to the desired range and to improve shelf-life and paint film characteristics. Preferably, a defoamer is included to prevent foaming or other coating problems during application.

DETAILED DESCRIPTION OF THE INVENTION

Any suitable modified vinyl acetate resin may be used as the primary paint film forming ingredient in the anti-fouling paint of this invention. These resins are vinyl acetates which have been modified to be soluble in alkali water solutions. Ordinarily, they are carboxylated vinyl resins such as the series of resins available from the Monsanto Company under the "Gelva" trademark and Vinac ASP 516 from Air Products, Inc. The water alkaline solution may contain any suitable proportion of vinyl resin. Preferably, from about 12 to 60 parts by weight resin is used, per 100 parts by weight water.

Any suitable poly funtional amine having low volatility may be used to adjust solution pH to the selected range. Typical such amines include tri-ethanol amine; tri-ethyl amine; tri-ethylene diamine; 2-dimethylamino-2-methyl-1-propanol; N,N-diethyl ethanolamine; 2-amino-2-methyl-1-propanol; N,N-dimethyl ethanolamine; and mixtures thereof. Agents having higher volatility, such as ammonia, are not effective since they evaporate from the film to an extent which makes the film too highly impervious to water, preventing the desirable leaching of toxicants to the film surface, and tend to reduce shelf-life. For the purposes of this invention, "low volatility" indicates that the amine will not significantly evaporate from the paint film over the ordinary life of a paint coating. Whether a specific poly-functional amine is effective can be determined by conventional empirical tests for a particular paint composition. However, in most cases the typical amines listed above are preferred in that they produce a durable paint film with the desired toxicant leaching characteristics. Of these, best results have been obtained with tri-ethanol amine which combines excellent paint characteristics with extended shelf-life. Preferably from about 6 to 30 parts by weight poly-functional amine are used per 100 parts water, depending on the pH desired. For best results, water solution pH should be above 9 before the resin is dissolved, and the pH of the final paint should preferably be adjusted (either by selection of the original water-amine solution pH or by addition of other agents as discussed below) to a pH range of about 8.5 to 9.0 to give the optimum combination of viscosity and shelf-life of the finished paint. Lower pH solutions tend to undesirably drop in viscosity with age, while much higher pH paint solutions tend to gel on aging.

A suitable quantity of urea formaldehyde resin in a water emulsion is preferably added to the paint solution to adjust the solution pH to the desired range. The urea formaldehyde resin emulsion has also been found to improve shelf-life and make the paint film more flexible. Typical urea-formaldehyde resins are available from The Borden Company under the Cosco Resin 5H designation. Best results are obtained with from 15 to 130 parts by weight of a urea formaldehyde resin emulsion per 100 parts by weight water.

Any suitable toxicant may be dispersed in the paint of this invention. Typical toxicants include copper compounds such as cuprous oxide, tin compounds such as organo tins, and mixtures thereof. While any suitable quantity of toxicant may be used, best results are obtained with from about 30 to 600 parts by weight toxicant per 100 parts water in the paint solution.

In many cases, to improve ease of application and paint film characteristics it is desirable to add a defoamer to the paint solution. Typical defoamers include diglycol laurate, Poly glycol P-1200 (Dow Chemical Company), Nopco JNB-1 (Nopco Chemical Company), Nalco 212 (National Aluminate Corporation) and mixtures thereof. Generally, from 5 to 8 parts by weight defoamer per 100 parts water is sufficient. Excess defoamer should be avoided, since it may adversely affect the wetting properties of the paint.

Manufacture of the paint is preferably accomplished by high speed dispersion of the ingredients at temperatures from 90° to 120° F. Higher temperatures should be avoided due to the possibility of adverse chemical reactions.

In the basic manufacturing process, it is preferred that where a total of about 100 parts by water will be used, from about 70 to 85 parts by weight water are mixed with the poly-functional amine and the modified poly vinyl acetate resin, is dissolved herein other ingredients such as the urea formaldehyde resin emulsion are incorporated, and the remaining water is added. If all of the water is added at the beginning, the pH of the mixture may drop too low and the mixture may gel or be undesirably reduced in viscosity. Most of the urea formaldehyde resin is added prior to addition of the toxicant since this raises mixture pH (typically to about 10.5) which aids in toxicant dispersion. Since addition of toxicant and the final quantity of water lowers the pH, it may be necessary to add further urea formaldehyde resin emulsion to bring the final pH back to the 8.5–9.0 range which gives optimum shelf-life and paint application characteristics. The amount of water in the urea formaldehyde resin emulsion is ordinarily so small as to be insignificant and will, at most, have a slight influence on paint viscosity, which can be empirically adjusted from batch-to-batch by slightly changing the quantity of direct water used, within the range given above.

DETAILED DESCRIPTION OF PREFERRED EMBODIMENTS

The following Examples detail preferred embodiments of the paint manufacturing method and paint of this invention. All parts and percentages are by weight unless otherwise indicated.

EXAMPLE I

About 8.5 gallons of water are mixed with about 1.5 gallons tri-ethanol amine for about 1 minute. About 82 fluid ounces of diglycol laurate defoamer are mixed into the solution for about 1 minute. About 18.5 pounds of Gelva C-3 modified vinyl acetate resin, available from Monsanto Company, are gradually added and dissolved in a dissolver at 3500 rpm at a temperature of about 80° F. About 46 fluid ounces of urea formaldehyde resin emulsion available from the Bordon Company, under the Casco Resin 5H designation are added and the solution is mixed for about 20 minutes. About 300 pounds of finely divided cuprous oxide toxicant are then dispersed in the solution in the dissolver at about 4500 rpm for about 5 minutes. The speed of the mixer is reduced to about 1000 rpm and an additional 2.25 gallons of water are slowly added over 1 minute, then about 1 gallon liquid area formaldehyde resin is added over about 2 minutes. The resulting anti-fouling paint has a viscosity of about 88 Kreb units and a pH of about 8.75. The paint is applied to a boat exposed to sea water and is observed over a 2 year period. The paint is found to have excellent application characteristics and durability and resists fouling by marine organisms for the entire period. The paint film appears to be very slightly soluble in sea water, allowing toxicant to gradually leach to the surface, so that effective resistance to fouling is maintained over the life of the paint.

EXAMPLE II

About 8.5 gallons of water are placed in a conventional large dissolver and about 1.5 gallons of tri-ethanol amine are added and mixed at about 3000 rpm for about 1 minute at about 90° F. About 82 fluid ounces of Polyglycol P-1200, a defoamer from the Dow Chemical Company are added and mixing is continued for 1 minute. About 18 pounds of Gelva C-5 modified poly-vinyl acetate resin, from the Monsanto Company and about 46 ounces of urea formaldehyde resin emulsion are added and mixing is continued for 20 minutes. Then about 150 pounds of finely divided cuprous oxide is added and mixed for about 5 minutes at about 4500 rpm while solution temperature is kept below about 120° F. Mixer speed is reduced to about 1000 rpm and an additional 2.25 gallons of water are added and mixed for about 1 minute. Finally, about 1 gallon of urea formaldehyde resin emulsion is added and mixed for about 2 minutes to adjust the solution pH to about 8.3. The paint is applied to panels which are then exposed to sea water for about 2 years. The paint is found to have excellent brushout and drying time characteristics. The paint is also very durable and resists fouling for the entire 2 year test period.

EXAMPLE III

About 10 gallons of water and about 2 gallons of triethyl amine are placed in a large high speed mixer and mixed for about 2 minutes at about 3000 rpm. About 16 pounds of Vinac ASP 516 carboxilated poly-vinyl acetate resin from Air Products, Inc. are dissolved in the solution while mixing is continued for about 20 minutes with the solution temperature held at about 110° F. Then about 40 fluid ounces of liquid urea formaldehyde resin are mixed in for about 1 minute. About 200 pounds of organo tin toxicant are dispersed in the solution over 5 minutes at about 1200 rpm. An additional 2 gallons of water and about 0.8 gallon liquid urea formaldehyde resin are slowly added to the solution and mixed for about 3 minutes. The resulting paint is found to have good application and durability characteristics and to resist fouling when exposed to sea water for extended time periods.

EXAMPLE IV

About 50 parts water and 5 parts tri-ethylene diamine are mixed in a small mixer maintained at about 75° F. for about 1 minute. About 10 parts of a modified poly-vinyl acetate resin available from the Borden Company are added to the solution and mixed for about 15 minutes. About 2 parts of liquid urea formaldehyde resin are added and mixed for about 1 minute. About 25 parts of a toxicant, finely divided cuprous oxide, are dispersed in the solution for about 10 minutes. Finally, mixing speed is reduced to about 800 rpm and about 10 parts liquid urea formaldehyde resin are added to bring the pH up to about 8.5. The resulting paint is found to have good shelf-life and application characteristics and to be durable and resistant to fouling in sea water.

EXAMPLE V

About 80 parts by weight water and about 14 parts N, N-diethyl ethanolamine are placed in a mixer maintained at about 120° F. and the mixer is operated at about 2500 rpm for about 3 minutes. About 2 parts of Nalco 212 defoamer from the National Aluminate Corporation are added and mixed for about 1 minute. About 30 parts modified poly-vinyl acetate resin available from the Monsanto Company under the Gelva C-3 V-10 description are mixed into the solution for about 20 minutes. About 55 parts of liquid urea formaldehyde resin are added and mixed for about 1 minute. About 300 parts finely divided organo tin are added and mixed at 4000 rpm for about 15 minutes. Then about 5 parts water and 25 parts liquid urea formaldehyde resin are slowly added while mixing at about 900 rpm over 3 minutes to bring the pH level to about 9. The resulting paint has excellent anti-fouling properties when exposed to sea water.

While the above examples describe a mumber of preferred embodiments and recite specific ingredients, proportions and conditions, these may be varied as discussed above with similar results. Where suitable, additional ingredients such as pigments, plasticizers, etc. may be included if desired.

Other modifications, applications and ramifications of the present invention will become apparent to those skilled in the art upon reading the present disclosure. These are intended to be included in this invention, as defined in the appended claims.

Having described my invention, what I claim as new is:

1. A water base paint resistant to fouling by marine organisms when exposed to sea water which comprises:
    (a) about 100 parts by weight water;
    (b) from about 12 to 60 parts by weight modified poly-vinyl acetate resin;
    (c) from about 6 to 30 parts by weight of a poly-functional amine having low volatility;
    (d) from about 15 to about 130 parts by weight liquid urea formaldehyde resin; and
    (e) from about 30 to 600 parts by weight of a finely divided toxicant.

2. The paint according to claim 1 wherein said poly-functional amine is selected from the group consisting of triethanol amine, tri-ethyl amine, tri-ethylene diamine, 2-dimethylamino-2-methyl-1-propanol, N,N-diethyl ethanolamine, 2-amino-2-methyl-1-propanol, N,N-dimethyl ethanolamine and mixtures thereof.

3. The paint according to claim 1 wherein said poly-functional amine is tri-ethanol amine.

4. The paint according to claim 1 wherein said toxicant is selected from the group consisting of cuprous oxide, organo tin and mixtures thereof.

5. The paint according to claim 1 further including from 5 to 8 parts by weight defoamer per 100 parts by weight water.

6. A method of manufacturing a water base paint which is resistant to fouling by marine organisms when exposed to sea water, which comprises the steps of:
    (a) placing in a mixer about 70 to 85 parts by weight water;
    (b) mixing therewith from about 12 to 60 parts by weight of a poly-functional amine having low volatility;
    (c) dissolving therein from about 6 to 36 parts by weight modified poly-vinyl acetate resin;
    (d) adding thereto from about 15 to 100 parts urea formaldehyde resin emulsion;
    (e) dispersing therein from about 30 to 600 parts of a toxicant;
    (f) mixing therewith sufficient water to bring the total water added to about 100 parts by weight;
    (g) mixing therewith sufficient urea formaldehyde resin emulsion to bring the solution pH to from about 8.5 to 9.

7. The method according to claim 6 wherein said poly-functional amine is selected from the group consisting of tri-ethanol amine, tri-ethyl amine, tri-ethylene diamine, 2-dimethylamino-2-methyl-1-propanol, N,N-diethyl ethanolamine, 2-amino-2-methyl-1-propanol, N,N-dimethyl ethanolamine and mixtures thereof.

8. The method according to claim 6 wherein said polyfunctional amine is tri-ethanol amine.

9. The method according to claim 6 wherein said toxicant is selected from the group consisting of cuprous oxide, organo tin and mixtures thereof.

10. The method according to claim 6 further including the step of adding from about 5 to 8 parts by weight defoamer to the initial solution of water and poly-functional amine.

11. The method according to claim 6 wherein the temperature throughout is maintained in the range of from about 75° F. to 120° F.

* * * * *